(12) United States Patent
Pien

(10) Patent No.: US 8,129,859 B2
(45) Date of Patent: Mar. 6, 2012

(54) EXTENSION CORD WITH WIRELESS TIMING FUNCTION

(75) Inventor: Jacob Pien, Hsinchu (TW)

(73) Assignee: Hurco Automation, Ltd., Hsinchu Hsien (TW)

( * ) Notice: Subject to any disclaimer, the term of this patent is extended or adjusted under 35 U.S.C. 154(b) by 414 days.

(21) Appl. No.: 12/546,589

(22) Filed: Aug. 24, 2009

(65) Prior Publication Data

US 2011/0043034 A1 Feb. 24, 2011

(51) Int. Cl.
*H02J 3/14* (2006.01)

(52) U.S. Cl. .......................................... 307/39

(58) Field of Classification Search .................... 307/38, 307/39, 40

See application file for complete search history.

(56) References Cited

U.S. PATENT DOCUMENTS 6,870,463 B2 * 3/2005 Dresti et al. ................. 340/10.4

(Continued)

*Primary Examiner* — Michael Rutland Wallis

(74) *Attorney, Agent, or Firm* — Rabin & Berdo, P.C.

(57) ABSTRACT

In an extension cord with wireless timing function, there are included a receptacle housing having more than one flush plug receptacles and internally including a current converter, a power switch and a plurality of electronic relays corresponding to the receptacles; a programmable logic controller in the receptacle housing for controlling the ON/OFF state of the receptacles; a wireless transmission module in the receptacle housing for receiving a wireless signal from a remote device; a power cord connected at an end to the power switch; and an operation and control module located on the receptacle housing and connected to the controller. Thus, timed power supply by each of the receptacles can be set and recorded at the remote device. When the power switch is turned to off, the controller automatically resets the receptacles to ON; and when the power switch is turned to on again, the receptacles will remain to "ON".

10 Claims, 4 Drawing Sheets

U.S. PATENT DOCUMENTS

| | | | |
|---|---|---|---|
| 7,812,478 B1 * | 10/2010 | Menas | 307/31 |
| 7,843,081 B2 * | 11/2010 | Lim | 307/39 |
| 7,994,654 B2 * | 8/2011 | Lee et al. | 307/39 |
| 2005/0036258 A1 * | 2/2005 | Ma et al. | 361/103 |
| 2009/0146494 A1 * | 6/2009 | Mori et al. | 307/38 |

* cited by examiner

EXTENSION CORD WITH WIRELESS TIMING FUNCTION

FIELD OF THE INVENTION

The present invention relates to an extension cord, and more particularly to an extension cord with wireless timing function to allow receptacles thereon to be wirelessly timed from a remote device to supply power. When the extension cord could not receive signals from the remote device, a user can input timing settings for the receptacles via an operation and control module on the extension cord or turn a power switch of the extension cord to off to reset the receptacles to ON state.

BACKGROUND OF THE INVENTION

Generally, an electric appliance used in a residential house or in an office building is connected to a power supply receptacle via a plug. When the electric appliance is not in use, a user would usually directly turn a power switch on the electric appliance to off. However, according to the design of an electric appliance, even when the power switch thereof is turned to off, the electric appliance is still in a standby state, and some electronic elements in the electric appliance will still consume electric power.

In the residential houses or the office buildings, including the public spaces, the accumulated power consumed and wasted by the internal electronic elements in the turned-off electric appliances is surprisingly high. And, serious waste of electric energy also occurs due to people's negligence in leaving electric appliances in the on state when the electric appliances should be turned off.

Generally, a power receptacle or a receptacle provided on an extension cord is designed for a plug on a power cord to plug in. When a consumer uses an electric appliance and wants to set a time for the electric appliance to automatically turn on or turn off at the set time point, the consumer has to buy an additional timer and connects the timer to the receptacle, so that the receptacle has the timing function. Then, the consumer can connect the power cord of the electric appliance to the timer. In this way, the power receptacle can have increased function and applicability to benefit general family and industrial users. However, the additional timer will increase the consumer's cost and bring inconveniences to the consumer.

In a conventional power control and management technique implement as a wireless power control and management device, there are included multiple arrayed slave sets and a master set. Each of the slave sets is provided with a high-frequency receiver circuit, a CPU control circuit, and a radio module. The CPU control unit is connected to switch and receptacle power supply circuits. The master set is provided with a high-frequency receiver circuit, a CPU control circuit, a radio module, a plurality of keys, and a display circuit.

Two-way signal transmission and reception is allowed between the master set and each of the slave sets, and each of the keys on the master set corresponds to a specific slave set. The CPU control circuit on the master set orders the radio module thereof to transmit a signal to a correspondent slave set, and the transmitted signal is received and further transmitted by the high-frequency receiver circuit of the slave set to the CPU control circuit of the slave set for controlling the switch and receptacle power supply circuits connected to that slave set to match the on/off state of the corresponding key on the master set.

In the above-described patented wireless power control and management device, the master-slave relation between the master set and each of the slave sets is centrally controlled. A slave set having been set to off by the master set is not allowed to be turned on from the end of the slave set. Thus, in the event lamps in a certain office are turned off by a master set, persons in the office can do nothing but to dangerously move in the dark. Further, the master set of such centrally controlled power control and management device is subject to purposeful and vicious destruction and invasion. In such a case, electric appliances connected to the slave sets will become failed to cause inconveniences to the users.

In another conventional power control and management technique implemented as an extension cord receptacle with timing function, a housing of which is provided with at least one flush plug receptacle connected to a timer circuit inside the housing. The timer circuit controls the timing setting of a corresponding receptacle. An extension cord and a plug are connected to the housing. A character liquid crystal display (LCD) is provided on the housing, and a plurality of keys are provided to one side of the character LCD. The character LCD and the keys are electrically connected to the timer circuits. A timing point for the timer circuit can be set via the keys. When an electric appliance is connected to one of the receptacles, the timer circuit will start counting until the timing point set for the receptacle is reached, and then the timer circuit will control the corresponding receptacle to on or off, so as to turn on or turn off the electric appliance connected to the receptacle.

Generally, the extension cord receptacle is disadvantageously laid on a floor near a corner and is not easily accessible for manually setting the timing point. Further, when the timer circuit controls the corresponding receptacle to on or off, the setting by the timer circuit can not be released from outside of the receptacle. In the event the extension cord with the receptacles thereof preset to ON is connected to a power source, dangers tend to occur due to a sudden conduction of the extension cord. On the other hand, in the event the extension cord with the receptacles thereof preset to OFF is connected to a power source and does not work, it tends to cause a wrong determination that the electric appliance is failed.

It is therefore tried by the inventor to develop a novel extension cord with wireless timing function to eliminate the drawbacks in the prior art.

SUMMARY OF THE INVENTION

A primary object of the present invention is to provide an extension cord with wireless timing function, so that the on/off state of receptacles provided on the extension cord can be centrally timed and recorded at a remote device through cooperation of a programmable logic controller, a wireless transmission module and an operation and control module provided on the extension cord.

Another object of the present invention is to provide an extension cord with wireless timing function and applying wireless timing system adopting distributed control. With the present invention, when a power switch of the extension cord is turned to off, an AC to DC converter stops supplying electric energy to a programmable logic controller on the extension cord, and an internal timing setting memory of the controller automatically resets the receptacles on the extension cord to ON; and when the power switch is turned to on again and the programmable logic controller does not receive any timing setting from a remote device, the receptacles will remain to "ON".

To achieve the above and other objects, the extension cord with wireless timing function and applying wireless timing system adopting distributed control according to the present invention includes a receptacle housing provided with more than one flush plug receptacle and internally including a plurality of normal-closed electronic relays in a number corresponding to that of the flush plug receptacles and respectively electrically connected to one of the flush plug receptacles, a current converter electrically connected to the electronic relays, and a power switch electrically connected to the current converter; a programmable logic controller arranged in the receptacle housing and electrically connected to the electronic relays for controlling the ON state and OFF state of the flush plug receptacles; a wireless transmission module arranged in the receptacle housing and electrically connected to the electronic relays for receiving a wireless transmission signal from a remote device and transmitting the received wireless transmission signal to the programmable logic controller; a power cord connected at an end to the receptacle housing to electrically connect to the power switch and the programmable logic controller in the receptacle housing, and at another end to a power plug for correspondingly plugging in an AC power source; and an operation and control module provided on one face of the receptacle housing and electrically connected to the programmable logic controller.

In a preferred embodiment of the present invention, when the power switch is turned to on and the programmable logic controller receives control from the remote device via the wireless transmission module, the programmable logic controller will control the electronic relays according to re-input timing settings, so that the electronic relays further control the flush plug receptacles to the close-circuit (ON) state or the open-circuit (OFF) state corresponding to the timing settings. In another preferred embodiment, when the power switch is turned to on and the programmable logic controller could not receive control from the remote device via the wireless transmission module, the flush plug receptacles are directly controlled to the close-circuit (ON) state. In a further embodiment, when the power switch is turned to on and the programmable logic controller could not receive control from the remote device via the wireless transmission module, timing settings are input via the operation and control module for controlling the electronic relays, which in turn controls the flush plug receptacles to the close-circuit (ON) state or the open-circuit (OFF) state corresponding to the input timing settings.

The operation and control module includes a display and a plurality of keys; the keys are provided for manually controlling the timing settings in the programmable logic controller, and the display showing the settings completed in the programmable logic controller. And, the keys includes at least a function key, an enter key, a selection key, and a cancel key.

In a preferred embodiment, the programmable logic controller and the wireless transmission module are together provided in one single control chip. A fuse switch is connected to and between the power switch and the power cord in series. Further, a current sensor is connected to each of the flush plug receptacles in series. The current sensors are provided to convert sensed current values into voltage for inputting to the programmable logic controller, so that the ON state of the individual flush plug receptacles is fed back to the programmable logic controller.

The remote device includes at least a keyboard, a screen, a central processing unit (CPU) connected to the screen and the keyboard, a memory unit electrically connected to the CPU, and a radio module electrically connected to the CPU. The CPU follows instructions input by a user via the keyboard and data of timing setting for each of the flush plug receptacles as stored in the memory unit to wirelessly transmit the setting data to the wireless transmission module via the radio module.

In the present invention, the wireless timing function applies the distributed control. When the power switch of the extension cord is turned to off and the current converter stops supplying electric energy to the programmable logic controller on the extension cord, the internal timing setting memory of the programmable logic controller automatically resets the receptacles on the extension cord to ON, and when the power switch is turned to on again and the programmable logic controller does not receive any timing setting from the remote device, the receptacles on the extension cord will remain to "ON".

The present invention is characterized in that the receptacle housing internally includes a programmable logic controller, a wireless transmission module and an operation and control module, these components cooperate with one another to allow the flush plug receptacles on the extension cord to be centrally set from a remote device but individually recorded about their timed power supply condition. In addition, in the event the wireless transmission module fails to link with the remote device, timing settings for the flush plug receptacles on the extension cord can still be input via the operation and control module provided on the extension cord. In a worse condition in which both the operation and control module and the wireless transmission module could not operate normally, all the flush plug receptacles on the extension cord can be restored to their default ON state simply by turning on the power switch again.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
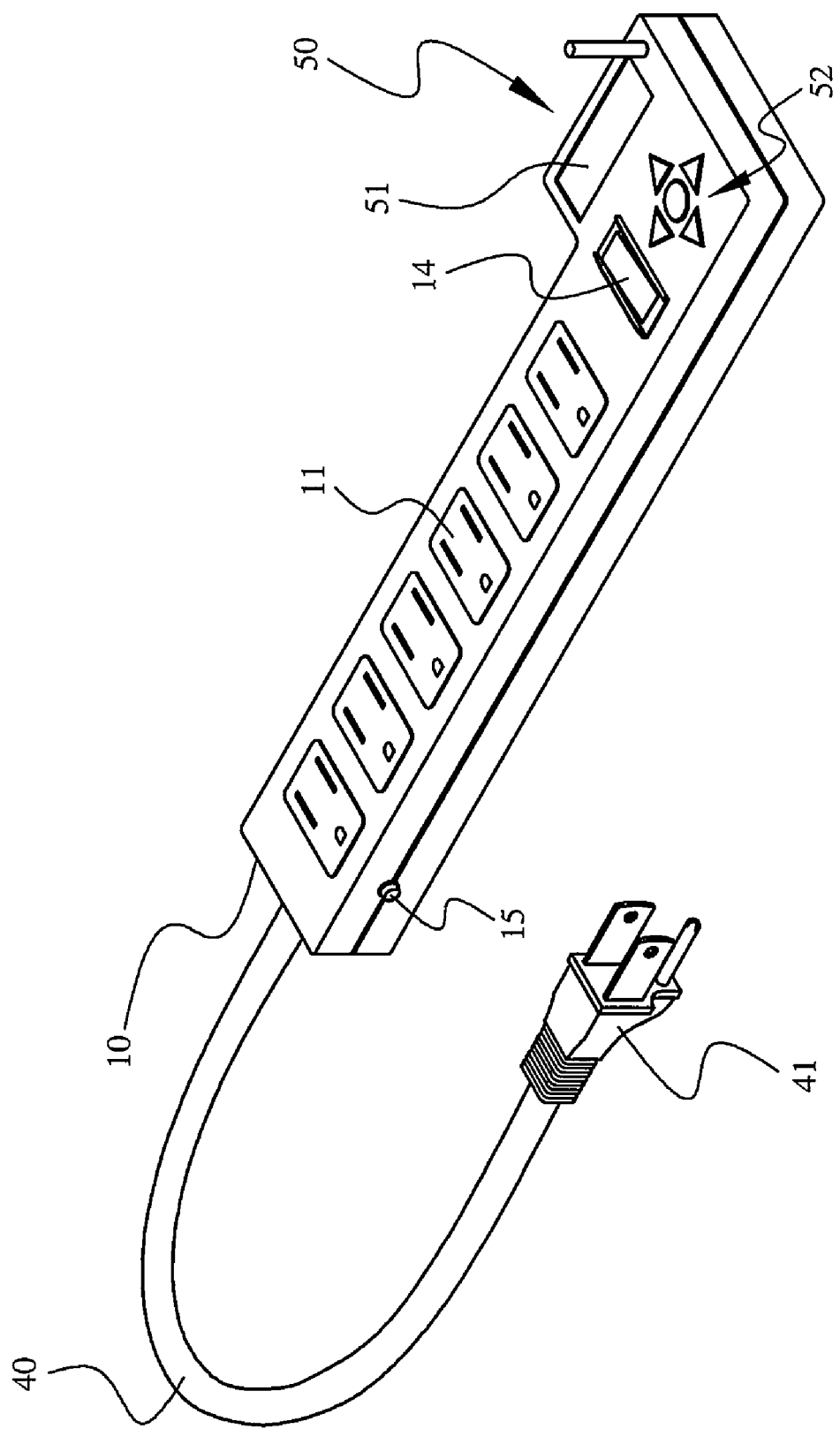
FIG. 1 is a perspective view of an extension cord with wireless timing function according to a preferred embodiment of the present invention.
Figure 2:
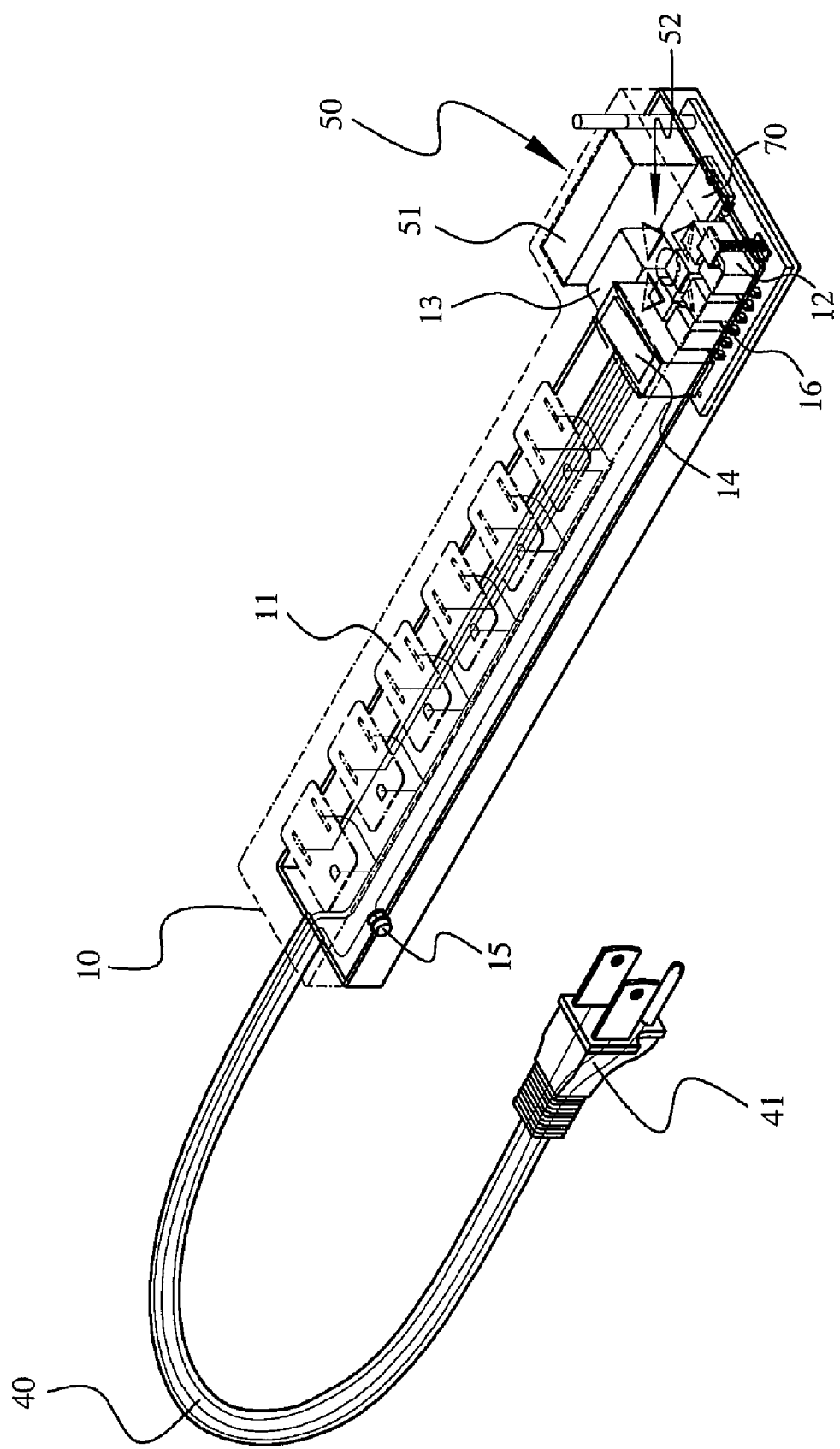
FIG. 2 is a phantom perspective view of the present invention showing the internal structure thereof.
Figure 3:
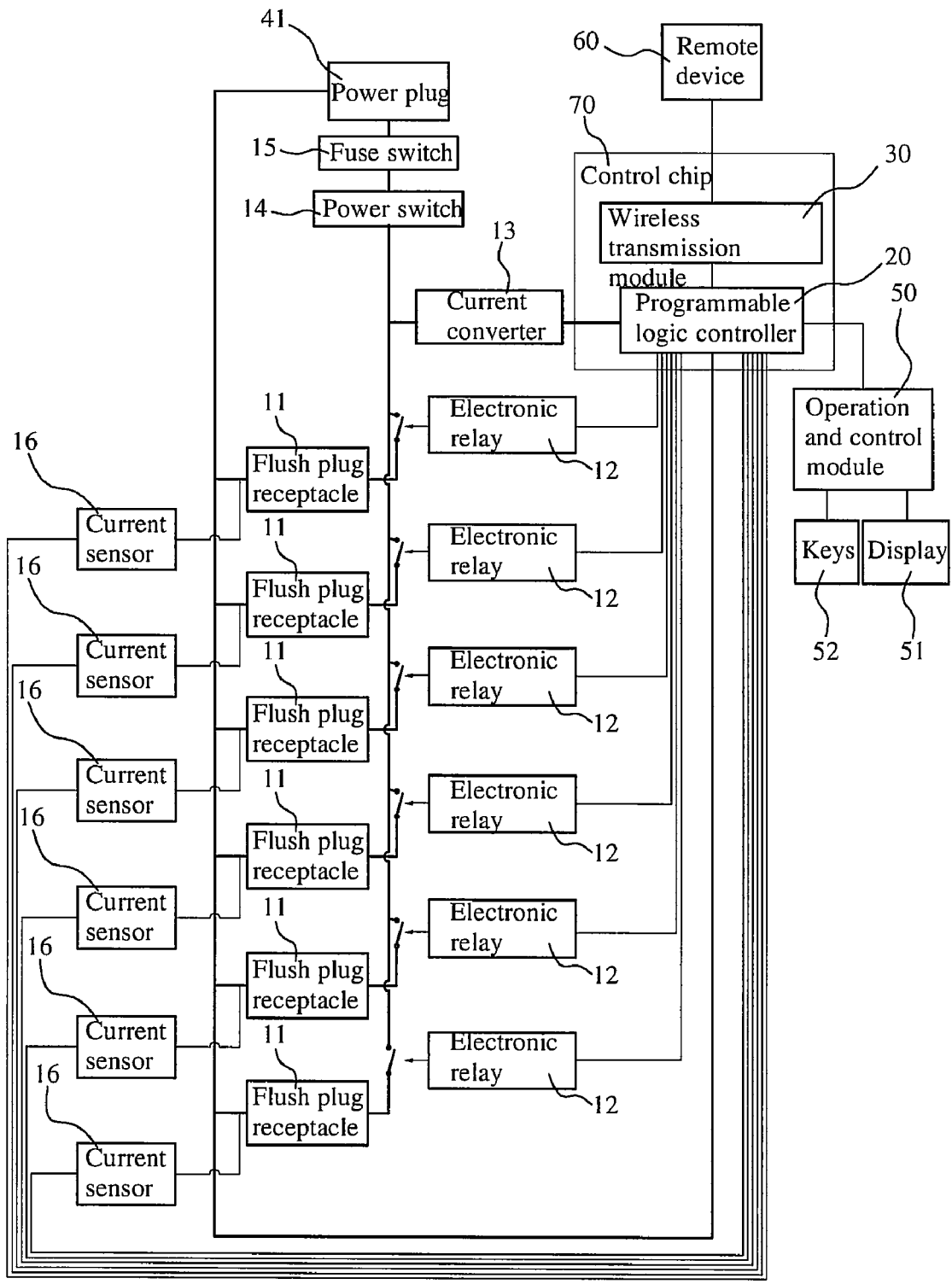
FIG. 3 is a block diagram showing internal circuits and signal connection of the present invention.

Please refer to FIGS. 1, 2 and 3. An extension cord with wireless timing function according to a preferred embodiment of the present invention includes a receptacle housing 10, a programmable logic controller 20 arranged inside the receptacle housing 10, a wireless transmission module 30 also arranged inside the receptacle housing 10, a power cord 40 extended from an end of the receptacle housing 10, and an operation and control module 50 located on one face of the receptacle housing 10.

On the receptacle housing 10, there is provided with more than one flush plug receptacle 11. Inside the receptacle housing 10, there are provided a plurality of normal-closed electronic relays 12 respectively corresponding to one of the flush plug receptacles 11, a current converter 13 and a power switch 14. The electronic relays 12 are electrically connected to the flush plug receptacles 11, the current converter 13 is electrically connected to the electronic relays 12 and converts alternating current (AC) to direct current (DC) for supplying electric energy to all other internal modules, and the power switch 14 is electrically connected to the current converter 13 for enabling or cutting off power supply to the whole extension cord.

In the illustrated preferred embodiment, the receptacle housing 10 is provided with six flush plug receptacles 11 arranged in one line. However, it is understood the number and the arrangement of the flush plug receptacles 11 illustrated in the preferred embodiment are only for exemplification and not intended in any way to restrict the present invention. That is, the flush plug receptacles 11 can be otherwise arranged in two parallel rows or even in other special patterns according to the exact number of the flush plug receptacles.

The programmable logic controller 20 is electrically connected to the electronic relays 12 for controlling the electronic relays 12 to enable the flush plug receptacles 11 to a close-circuit (ON) state or an open-circuit (OFF) state as preset therefor.

The wireless transmission module 30 is electrically connected to the programmable logic controller 20. The wireless transmission module 30 receives a wireless transmission signal from a remote device 60, and transmits settings represented by the wireless transmission signal to the programmable logic controller 20, so as to perform timing setting in the programmable logic controller 20. In the illustrated preferred embodiment, the wireless transmission module 30 and the programmable logic controller 20 are together provided in one single control chip 70.

The power cord 40 is electrically connected at an end to the power switch 40 and the programmable logic controller 20 inside the receptacle housing 10, and at another end to a power plug 41, which can be correspondingly plugged in an alternating current (AC) power source.

The operation and control module 50 is electrically connected to the programmable logic controller 20, and includes a display 51 and a plurality of keys 52. Via the keys 52, a user can manually operate to control the timing setting in the programmable logic controller 20. The display 51 can show the settings completed in the programmable logic controller 20. In a preferred embodiment of the present invention, the keys 52 include at least a function key, an enter key, a selection key, and a cancel key.

When the power switch 14 is turned to on and the programmable logic controller 20 receives control from the remote device 60 via the wireless transmission module 30, the programmable logic controller 20 controls the electronic relays 12 according to re-input timing settings, so that the electronic relays 12 further control the flush plug receptacles 11 to the close-circuit (ON) state or the open-circuit (OFF) state corresponding to the timing settings.

Further, when the power switch 14 is turned to one and the programmable logic controller 20 could not receive the control from the remote device 60 via the wireless transmission module 30, the flush plug receptacles 11 are directly controlled to the close-circuit (ON) state.

Furthermore, when the power switch 14 is turned to on and the programmable logic controller 20 could not receive the control from the remote device 60 via the wireless transmission module 30, a user can input timing settings via the operation and control module 50 to control the electronic relays 12, which in turn control the flush plug receptacles 11 to the close-circuit (ON) state or the open-circuit (OFF) state corresponding to the timing settings.

In a preferred embodiment, a fuse switch 15 is connected to and between the power switch 14 and the power cord 40 in series. The fuse switch 15 is provided for protecting the circuits against overload. In the event of overloaded circuits, the fuse switch 15 will trip and cut off the power supply to the power cord 40. At this point, the user needs only to reconnect the fuse switch 15 for the extension cord to work again. A current sensor 16 is further connected to and between each of the flush plug receptacles 11 and the programmable logic controller 20 in series. The current sensors 16 are provided to convert sensed current values into voltage for inputting to the programmable logic controller 20, so that the ON state of the individual flush plug receptacles 11 can be fed back to the programmable logic controller 20.

Figure 4:
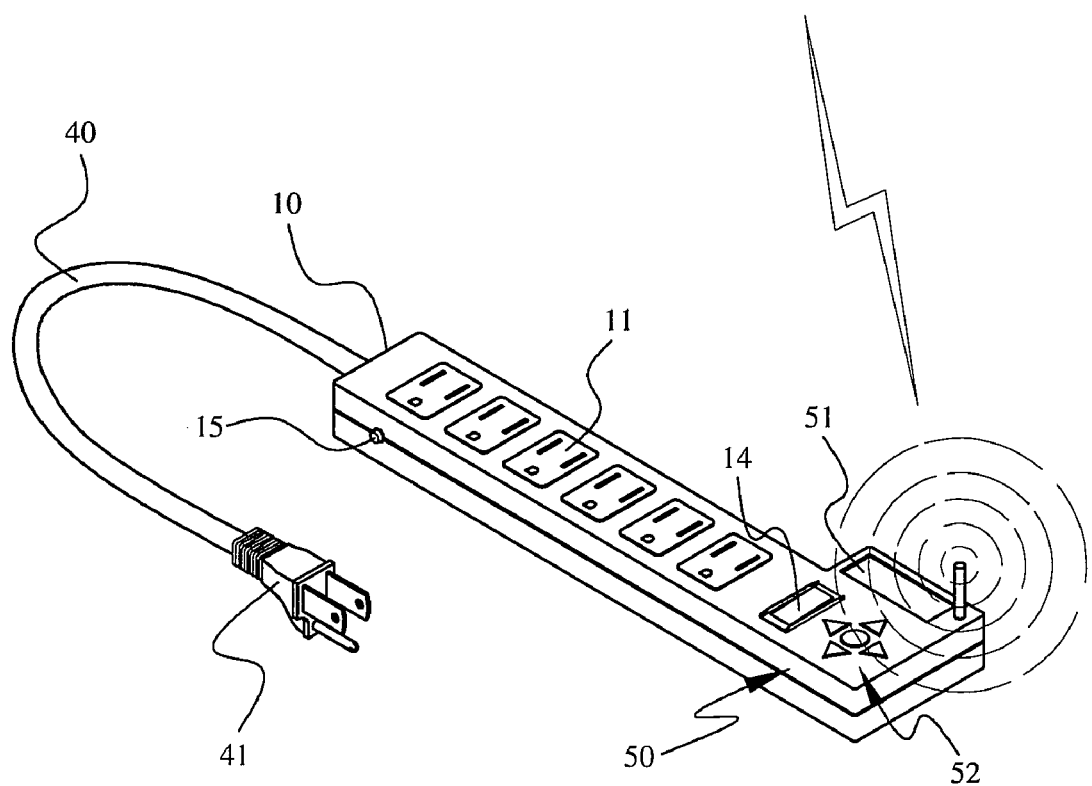
FIG. 4 is a conceptual view showing the use of the present invention with a remote device.

Please refer to FIG. 4. The remote device 60 is provided with, among others, a keyboard (not shown), a screen 61, a central processing unit (CPU) 62 connected to the screen 61 and the keyboard, a memory unit (not shown) electrically connected to the CPU 62, and a radio module 63 electrically connected to the CPU 62.

Based on the instruction input by a user via the keyboard and data of timing setting for each of the flush plug receptacles 11 as stored in the memory unit, the CPU 62 wirelessly transmits the setting data to the wireless transmission module 30 via the radio module 63.

Please refer to FIGS. 3 and 4. In the present invention, when the power switch 14 is turned to on, power is supplied to the control chip 70 via the current converter 13, allowing the programmable logic controller 20 and the wireless transmission module 30 to operate. After being linked with the remote device 60 via the wireless transmission module 30 to receive the timing settings, the programmable logic controller 20 immediately drives the electronic relays 12 for their corresponding flush plug receptacles 11 to start supplying current. Meanwhile, the current sensors 16 correspondingly connected to the flush plug receptacles 11 start recording the time of use and the ON state of the flush plug receptacles 11 and transmit monitoring data back to the remote device 60 for showing on the screen 61.

In the case the programmable logic controller 20 could not be linked with the remote device 60 via the wireless transmission module 30, the user can also directly input the timing settings and show the input on the display 51 of the operation and control module 50 by operating the keys 52.

According to the present invention, when the power switch 14 is turned to off, the flush plug receptacles 11 would no longer supply any current. However, since the wireless timing setting at the programmable logic controller 20 is of a distributed control, the programmable logic controller 20 can clear the ON state originally set in an internal memory thereof to achieve a reset effect. When the power switch 14 is turned to on again, since the programmable logic controller 20 has already driven all the electronic relays 12 according to a default state, all the flush plug receptacles 11 will start supplying current again. In the event the programmable logic controller 20 could not obtain instructions from the remote device 60 or the operation and control module 50, this design allows resetting of the flush plug receptacles 11 to the ON state and thereby advantageously increases the convenience in using the extension cord.

For example, in the event a lamp in an office is turned off due to the timing setting therefor, an employee in the office can turn the power switch 14 to off and then turn it to on again to reset the receptacles on the extension cord to the ON state. In this manner, every lamp can be separately controlled to on or off to avoid dangers that possibly occur in a fully dark environment and to prevent a failed extension cord resulted from a purposely destructed remote device 60. Thus, the extension cord of the present invention is safer for use.

In conclusion, the extension cord with wireless timing function provided by the present invention internally includes a programmable logic controller, a wireless transmission module and an operation and control module. These components cooperate with one another to allow the flush plug receptacles on the extension cord to be centrally set from a remote device but individually recorded about their timed power supply condition. In addition, in the event the wireless transmission module fails to link with the remote device, timing settings for the flush plug receptacles on the extension cord can still be input via the operation and control module provided on the extension cord. In a worse condition in which both the operation and control module and the wireless transmission module could not operate normally, all the flush plug receptacles on the extension cord can be restored to their default ON state simply by turning on the power switch again.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An extension cord with wireless timing function and applying a wireless timing system adopting distributed control, comprising:
   a receptacle housing having more than one flush plug receptacle provided thereon and being internally provided with a plurality of normal-closed electronic relays in a number corresponding to that of the flush plug receptacles, a current converter electrically connected to the electronic relays, and a power switch electrically connected to the current converter; and the electronic relays being electrically connected to the flush plug receptacles;
   a programmable logic controller arranged inside the receptacle housing and electrically connected to the electronic relays for controlling close-circuit (ON) state and open-circuit (OFF) state of the flush plug receptacles;
   a wireless transmission module arranged inside the receptacle housing and electrically connected to the programmable logic controller for receiving a wireless transmission signal from a remote device and transmitting the received wireless transmission signal to the programmable logic controller;
   a power cord having an end connected to the receptacle housing to electrically connect to the power switch and the programmable logic controller inside the receptacle housing; the power cord having another end connected to a power plug for plugging in a corresponding AC power source; and
   an operation and control module being provided on one face of the receptacle housing and electrically connected to the programmable logic controller; and
   wherein when the power switch is turned to off, a timing setting memory in the programmable logic controller automatically resets and the receptacles on the extension cord are set to the close-circuit (ON) state; and when the power switch is turned to on again but the programmable logic controller does not receive timing settings from the remote device, the receptacles on the extension cord will remain to the ON state.

2. The extension cord with wireless timing function as claimed in claim 1, wherein, when the power switch is turned to on and the programmable logic controller receives control from the remote device via the wireless transmission module, the programmable logic controller controls the electronic relays according to re-input timing settings, so that the electronic relays further control the flush plug receptacles to the close-circuit (ON) state or the open-circuit (OFF) state corresponding to the timing settings.

3. The extension cord with wireless timing function as claimed in claim 1, wherein, when the power switch is turned to on and the programmable logic controller could not receive control from the remote device via the wireless transmission module, the flush plug receptacles are directly controlled to the close-circuit (ON) state.

4. The extension cord with wireless timing function as claimed in claim 1, wherein, when the power switch is turned to on and the programmable logic controller could not receive control from the remote device via the wireless transmission module, timing settings are input via the operation and control module for controlling the electronic relays, which in turn control the flush plug receptacles to the close-circuit (ON) state or the open-circuit (OFF) state corresponding to the input timing settings.

5. The extension cord with wireless timing function as claimed in claim 1, wherein the operation and control module includes a display and a plurality of keys; the keys being provided for manually controlling the timing setting in the programmable logic controller, and the display showing the settings completed in the programmable logic controller.

6. The extension cord with wireless timing function as claimed in claim 5, wherein the keys includes at least a function key, an enter key, a selection key, and a cancel key.

7. The extension cord with wireless timing function as claimed in claim 1, wherein the programmable logic controller and the wireless transmission module are together provided in one single control chip.

8. The extension cord with wireless timing function as claimed in claim 1, further comprising a fuse switch connected to and between the power switch and the power cord in series.

9. The extension cord with wireless timing function as claimed in claim 1, further comprising a current sensor connected to each of the flush plug receptacles in series; the current sensors being provided to convert sensed current values into voltage for inputting to the programmable logic controller, so that the ON state of the individual flush plug receptacles is fed back to the programmable logic controller.

10. The extension cord with wireless timing function as claimed in claim 1, wherein the remote device includes at least a keyboard, a screen, a CPU connected to the screen and the keyboard, a memory unit electrically connected to the CPU, and a radio module electrically connected to the CPU; the CPU following instructions input by a user via the keyboard and data of timing setting for each of the flush plug receptacles as stored in the memory unit to wirelessly transmit the setting data to the wireless transmission module via the radio module.

* * * * *